(12) United States Patent
Kim et al.

(10) Patent No.: US 8,813,521 B2
(45) Date of Patent: Aug. 26, 2014

(54) FLOAT BATH FOR MANUFACTURING GLASS; FLOAT GLASS FORMING METHOD UTILIZING THE SAME AND METHOD FOR INSTALLING BARRIERS TO THE FLOAT BATH

(75) Inventors: Woo-Hyun Kim, Dongducheon-si (KR); Sang-Oeb Na, Seoul (KR); Won-Jae Moon, Seoul (KR); Jeong-Deok Kim, Seoul (KR); Kil-Ho Kim, Suwon-si (KR); Heui-Joon Park, Paju-si (KR); Jin Han, Goyang-si (KR); Dong-Shin Shin, Incheon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/430,163

(22) Filed: Mar. 26, 2012

(65) Prior Publication Data

US 2012/0180530 A1  Jul. 19, 2012

Related U.S. Application Data

(62) Division of application No. 13/089,688, filed on Apr. 19, 2011.

(30) Foreign Application Priority Data

Apr. 20, 2010 (KR) .................. 10-2010-0036528

(51) Int. Cl.
*C03B 18/16* (2006.01)
*C03B 18/06* (2006.01)

(52) U.S. Cl.
CPC ................ *C03B 18/06* (2013.01); *C03B 18/16* (2013.01)
USPC ............................. 65/99.5; 65/99.1; 65/99.2

(58) Field of Classification Search
CPC ........ C03B 18/02; C03B 18/04; C03B 18/06; C03B 18/16
USPC .................................................. 65/99.1–101
See application file for complete search history.

(56) References Cited

U.S. PATENT DOCUMENTS

| 3,485,617 | A |   | 12/1969 | Lawrenson |             |
|-----------|---|---|---------|-----------|-------------|
| 3,584,475 | A | * | 6/1971  | Galey et al. | ........................ 65/24 |
| 3,584,477 | A | * | 6/1971  | Hainsfurther | ................ 65/182.5 |
| 3,607,199 | A | * | 9/1971  | Itakura et al. | ................ 65/182.3 |
| 3,607,202 | A | * | 9/1971  | Swillinger | .................... 65/182.3 |
| 3,615,315 | A | * | 10/1971 | Michalik et al. | ............... 65/25.3 |
| 3,630,705 | A | * | 12/1971 | Owa | ................................. 65/99.5 |
| 3,767,375 | A | * | 10/1973 | Brichard et al. | ............. 65/182.5 |

(Continued)

FOREIGN PATENT DOCUMENTS

| CN | 101115687 A  | 1/2008  |
| JP | 50-116509    | 9/1975  |
| JP | H3-1936 U    | 1/1991  |
| JP | 2000313628 A | 11/2000 |

*Primary Examiner* — Jodi C Franklin
(74) *Attorney, Agent, or Firm* — McKenna, Long & Aldridge LLP

(57) ABSTRACT

A float bath for manufacturing glass includes a slot formed in a bottom block of the float bath in which a molten metal is to be filled, a barrier member capable of being inserted into the slot, a receiving portion formed in at least one side block that connects with the bottom block so as to communicate with the slot, and a placing member placed in the receiving portion to be connected to one end of the barrier member.

2 Claims, 3 Drawing Sheets

(56) References Cited

U.S. PATENT DOCUMENTS

| | | | |
|---|---|---|---|
| 3,790,361 A | 2/1974 | Lawrenson | |
| 3,925,051 A | 12/1975 | Lawhon | |
| 4,092,140 A * | 5/1978 | Cerutti et al. | 65/99.3 |
| 4,197,106 A * | 4/1980 | Trevorrow et al. | 65/99.3 |
| 4,217,125 A * | 8/1980 | Dickinson | 65/99.3 |
| 4,279,634 A | 7/1981 | Sisoler et al. | |
| 4,421,541 A * | 12/1983 | Eischen et al. | 65/99.3 |
| 2006/0110603 A1 * | 5/2006 | Langsdorf et al. | 428/426 |
| 2006/0260362 A1 * | 11/2006 | Uhlik et al. | 65/182.3 |
| 2007/0209395 A1 * | 9/2007 | Iga et al. | 65/99.6 |
| 2007/0238603 A1 * | 10/2007 | Kabashima et al. | 501/128 |
| 2008/0028795 A1 | 2/2008 | Kamihori et al. | |
| 2010/0291347 A1 * | 11/2010 | Langsdorf et al. | 428/141 |
| 2011/0252832 A1 * | 10/2011 | Kim et al. | 65/99.2 |

* cited by examiner

FLOAT BATH FOR MANUFACTURING GLASS; FLOAT GLASS FORMING METHOD UTILIZING THE SAME AND METHOD FOR INSTALLING BARRIERS TO THE FLOAT BATH

CROSS-REFERENCE TO RELATED APPLICATION

This application is a divisional application of U.S. patent application Ser. No. 13/089,688, filed on Apr. 19, 2011, which claims priority under 35 USC 119(a) to Korean Patent Application No. 10-2010-0036528 filed in Republic of Korea on Apr. 20, 2010, both of which are incorporated in their entireties herein by reference.

BACKGROUND OF THE INVENTION

1. Field of the Invention

The present invention relates to a float bath for manufacturing glass, a float glass forming method using the float bath, and a method for installing barriers to the float bath. More particularly, the present invention relates to a float bath for manufacturing glass, which has an improved barrier installation structure for controlling the flow of a molten metal received in the float bath, a float glass forming method using the float bath, and a method for installing barriers to the float bath.

2. Description of the Related Art

Generally, an apparatus for manufacturing a float glass (also known as sheet glass, flat glass, or plate glass) using a float glass process is used to manufacture a float glass having a predetermined size (width, thickness, or the like) by continuously supplying molten glass onto a flowing molten metal such as molten tin or tin alloy stored in a float bath, floating the molten glass on the molten metal to form a molten glass ribbon into a band shape with a constant thickness, and pulling up the glass ribbon toward an annealing lehr near an exit of the float bath.

Here, the molten metal includes, for example, tin or tin alloy, and has a greater specific gravity than the molten glass. The molten metal is received in a float chamber where a reducing atmosphere of hydrogen ($H_2$) and/or nitrogen ($N_2$) gas is introduced. The float bath in the float chamber is configured to contain the molten metal therein. The float bath has a horizontally extending structure and includes a high heat resistant material (for example, bottom blocks) therein. The molten glass forms a molten glass ribbon while moving from an upstream end of the float bath to a downstream end. The molten glass ribbon is lifted up at a location (hereinafter, referred to as a take-off point) set on the downstream end of the float bath to stay away from the molten metal, and delivered to an annealing lehr of the next process. Meanwhile, an inlet and an outlet of the float chamber should have certain temperature gradients. The molten metal contacting the molten glass and the upper site in the float chamber should also have temperature gradients.

However, since tin frequently used as the molten metal rapidly propagates heat and is in liquid state, the temperature gradient in the float bath may be easily broken due to heat convection which equalizes the temperature. Thus, the float bath should have a sufficient length. Similarly, so that the atmosphere of the upper portion of the molten metal has a predetermined equalized temperature difference by convection, the float bath needs a sufficiently long structure. Also, shaping members such as so-called 'top-roll' are disposed at a predetermined region of the float bath to enlarge the width of the glass ribbon and thus adjust the thickness of the float glass. Thus, the region where top-rolls are disposed is heated by heating members. Due to this condition, it is also necessary to increase the length of the float bath.

FIG. 1 is a side sectional view showing a conventional float bath, and FIG. 2 is a partially sectioned perspective view showing the conventional float bath of FIG. 1.

Referring to FIGS. 1 and 2, a conventional float bath 1 has a barrier member 3 installed in a width direction of a bottom block 2. The barrier member 3 functions to decrease or limit mixing of molten metals M between a high temperature region and a low temperature region in the float bath 1 to maintain a desired temperature difference (gradient) between two regions. In other words, the barrier member 3 plays a role of keeping the molten metal M in a high temperature forming region at the upstream of the float bath 1. The barrier member 3 is generally made of carbon material, or the like. Also, the barrier member 3 is inserted into a dovetail slot 4 formed in the bottom block 2. An installation groove 6 is provided in the bottom block 2 adjacent to a side block 5 of the float bath 1 so that the barrier member 3 is inserted therein.

However, since the upper portion of the installation groove 6 is opened while the float bath 1 forms a float glass G, the molten metal M is collected in the installation groove 6. In addition, the molten metal M may float in a region above the installation groove 6. As a result, the barrier member 3 of the conventional float bath 1 is not able to block the flow of the molten metal M in at least one end of the float bath 1 in a width direction. Also, the barrier member 3 is limited in controlling the flow of the molten metal M since the molten metal M collected in the installation groove 6 may flow in whirls.

Meanwhile, there are some conventional cases where a barrier is installed over the entire length of a bottom block in a width direction. However, for this purpose, a side block should be installed after barriers are installed over the entire length of the bottom block. In this case, when it is needed to repair or exchange the barrier, the side block should be dismantled from the bottom block, which is very difficult and not economic.

SUMMARY OF THE INVENTION

The present invention is conceived to solve the problems of the prior art, and therefore the present invention is directed to providing a float bath for manufacturing glass, which allows a barrier member to be stably and easily installed over the entire length of the float bath in a width direction and also ensures easy maintenance and exchange of the barrier member without dismantling a side block from a bottom block. The present invention is also directed to a float glass forming method using the float bath, and a method for installing barriers to the float bath.

In one aspect, the present invention provides a float bath for manufacturing glass, which includes a slot formed in a bottom block of the float bath in which a molten metal is to be filled; a barrier member capable of being inserted into the slot; a receiving portion formed in at least one side block that connects with the bottom block so as to communicate with the slot; and a placing member placed in the receiving portion to be connected to one end of the barrier member.

Preferably, the placing member includes a barrier part contacting at least one end of the barrier member to give a barrier function over the entire length of the float bath in a width direction thereof; and a side part protruding perpendicular to the barrier part to form substantially the same plane as the side block.

Preferably, the float bath further includes a fastener for fixing the placing member to the receiving portion.

Preferably, the fastener includes a fixing protrusion capable of being inserted into a fastener groove formed in the placing member; and a fastener body extending from the fixing protrusion to be installed to the side block.

Preferably, the slot has a dovetail shape, and the barrier has an insert portion with a dovetail shape, which is capable of being inserted into the dovetail-shaped slot.

Preferably, the barrier member has a plurality of barriers successively contacting each other and having a predetermined length.

Preferably, the barrier member is made of the same material as the bottom block.

Preferably, the barrier member includes a firebrick.

In another aspect of the present invention, there is also provided a method for installing barriers to a float bath that includes a bottom block with a slot in a width direction thereof and a side block with a receiving portion communicating with the slot, the method including (a) inserting a plurality of barriers into the slot successively through the receiving portion; (b) positioning a placing member to the receiving portion so that the placing member is located in contact with an outermost barrier closest to the side block; and (c) fixing the placing member.

In still another aspect of the present invention, there is also provided a method for forming a float glass, which includes successively supplying a glass in a molten state onto the molten metal from one end of the float bath; forming the glass on the molten metal into a glass ribbon; and successively pulling the glass ribbon from the other end of the float bath.

The float bath for manufacturing glass, the float glass forming method using the float bath, and the method for installing barriers to the float bath according to the present invention have the following effects.

First, since the barrier member may be conveniently installed over the entire bottom surface of the float bath, the temperature gradient demanded by the float bath may be more stably maintained.

Second, the barrier may be easily separated through a receiving portion formed at the side block without dismantling the side block from the bottom block.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, preferred embodiments of the present invention will be described in detail with reference to the accompanying drawings.

Figure 1:
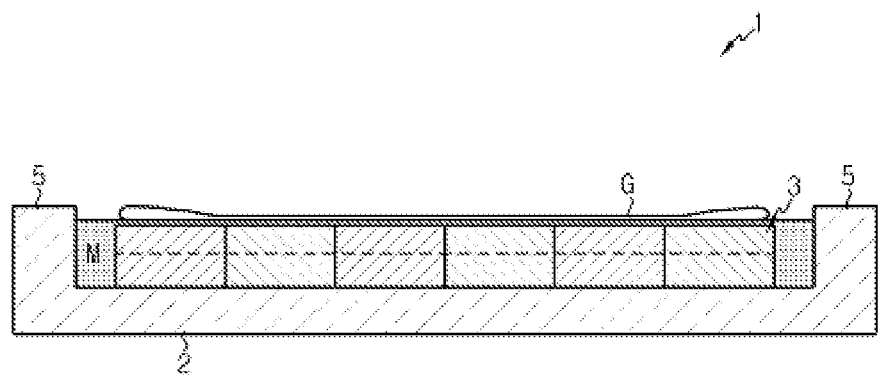
FIG. 1 is a side sectional view showing a conventional float bath.
Figure 2:
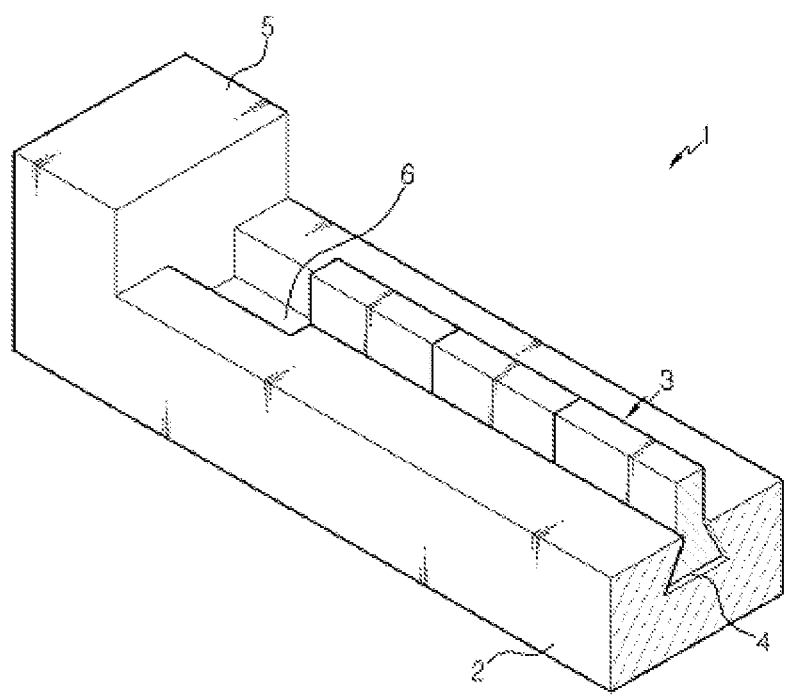
FIG. 2 is a partially sectioned perspective view showing the conventional float bath of FIG. 1.
Figure 3:
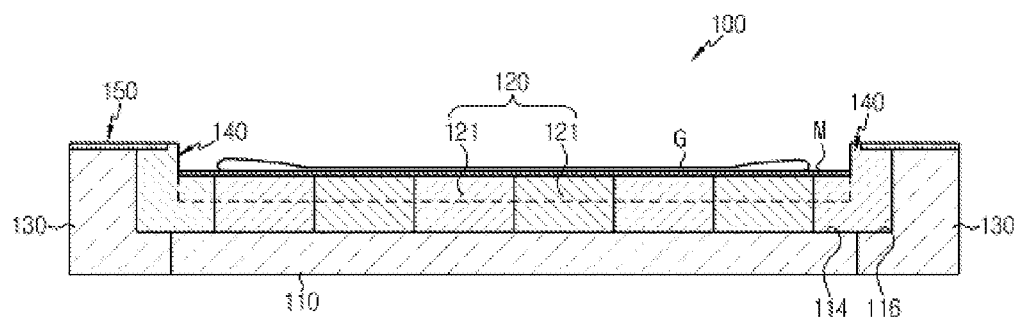
FIG. 3 is a side sectional view showing a float bath according to a preferred embodiment of the present invention.
Figure 4:
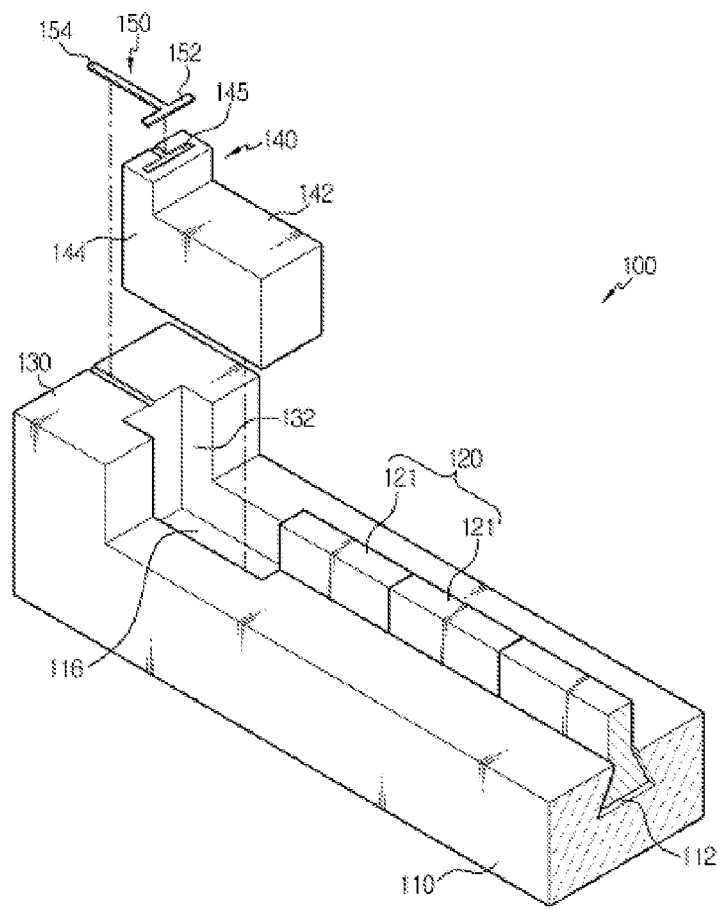
FIG. 4 is a partially sectioned perspective view showing the float bath of FIG. 3.
Figure 5:
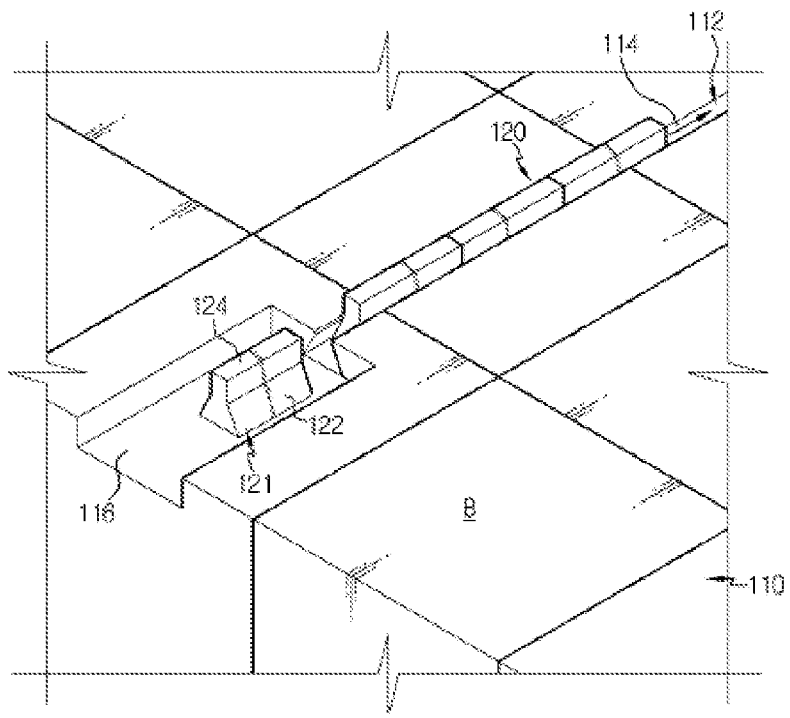
FIG. 5 is a partially sectioned perspective view schematically illustrating a process of inserting barriers to a bottom block according to a preferred embodiment of the present invention.
Figure 6:
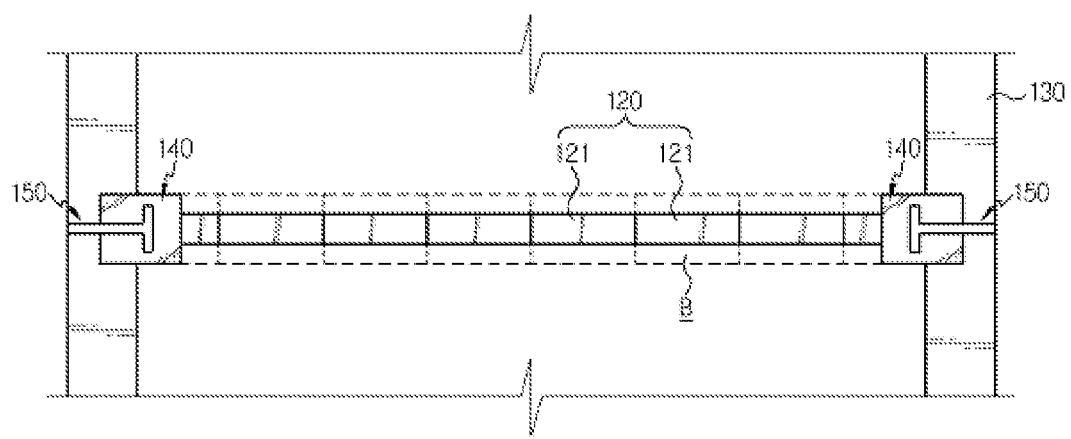
FIG. 6 is a plane view showing a coupling state of the float bath of FIG. 3.

FIG. 3 is a side sectional view showing a float bath according to a preferred embodiment of the present invention, FIG. 4 is a partially sectioned perspective view showing the float bath of FIG. 3, FIG. 5 is a partially sectioned perspective view schematically illustrating a process of inserting barriers to a bottom block according to a preferred embodiment of the present invention, and FIG. 6 is a plane view showing a coupling state of the float bath of FIG. 3.

Referring to FIGS. 3 to 6, a float bath 100 for manufacturing glass according to this embodiment includes a slot 112, formed in a bottom block 110 of the float bath 100, barrier members 120 that may be inserted into the slot 112, a receiving portion 132 formed in a side block 130 that contacts the bottom block 110 so that the receiving portion 132 is communicated with the slot 112, and a placing member 140 placed on the receiving portion 132 and connectable to one end of at least one of the barrier members 120.

The float bath 100 of this embodiment is used for manufacturing glass by a so-called floating process, and the upper portion of the float bath 100 is substantially sealed by a roof (not shown) having electric resistance heating elements (not shown).

Molten metal M such as molten tin or molten tin alloy is stored in the float bath 100. Molten glass G flows into the float bath 100 with its flow rate being controlled by a gate (not shown) located at the upstream of the float bath 100. While the molten glass G moves from the upstream of the float bath 100 to the downstream, the molten metal M flows by the molten glass G. In this process, the molten metal M flows from upstream to downstream of the float bath 100 that is kept at relatively high temperature by the temperature gradient in the float bath 100, and also the molten metal M flows from the center of the float bath 100 to both sides. While moving from the upstream to the downstream, the molten glass G is formed into a thin ribbon shape with desired thickness and width and is pulled by lift-out rollers (not shown) installed at the outlet of a float chamber to go away from a bath surface of the molten metal M at a take-off point. Also, after passing over the lift-out roller, the float glass G moves toward an annealing lehr (not shown) of the next process.

The inner circumference of the float chamber is composed of a gas mixture of nitrogen and hydrogen, and the gas mixture is kept with a pressure slightly higher than an ambient pressure. The molten metal M and the ribbon-shaped molten glass G are kept at about 600 to 1,300° C. by means of electric resistance heating elements. The molten glass G is non-alkali glass, soda-lime glass, or the like. Flow generating principle and structure of the molten metal M in the float bath 100 as well as introduction, ribbon-shaping, movement and discharge of the molten glass G are already well known in the art as a floating process, and they are not described in detail here.

The bottom block 110 of the float bath 100 has a structure in which a plurality of bricks B (see FIG. 5) containing refractory materials such as firebricks is coupled by lining.

The bottom block 110 is surrounded and protected by a steel casing (not shown). A gap between bricks B of the bottom block 110 of the float bath 100 is preferably determined in consideration of the height of the bricks themselves. Also, individual bricks B need corrosion resistance for the molten metal M, alkali resistance for $K_2O$ or $Na_2O$ included in the glass G, and anti-spalling property for coping with temperature change accompanied by exchange or change of a glass product. Also, side blocks 130 contacting the bottom block 110 are installed at both sides of the float bath 100.

The slot 112 formed in the bottom block 110 is for example provided near a shoulder zone that is narrowed from a high temperature wide zone (not shown) at the upstream of the float bath 100 to a low temperature narrow zone (not shown) at the downstream. The slot 112 is preferably formed to have a dovetail shape. The slot 112 is formed over the entire length of the float bath 100 in a width direction.

Meanwhile, as shown in FIGS. 4 and 5, the slot 112 has a first portion 114 having a dovetail shape so that the barrier member 120 is inserted and then fixed therein, and a second portion 116 for inserting the barrier member 120 from at least one side of the bottom block 110 toward the center. The first portion 114 of the slot 112 has a dovetail shape as mentioned above. However, the second portion 116 has a width greater than the width of an insert portion 122 of each barrier 121 and a length greater than at least the length of each barrier, as described above, so as to provide a space through which the barrier member 120 may be inserted. Also, the second portion 116 of the slot 112 is preferably formed at both sides of the float bath 100. In this case, the barrier member 120 may be inserted from both sides of the float bath 100 to the center, which facilitates the installing work of the barrier member 120. In addition, it becomes easier to set the number of barriers 121 appropriately in consideration of the length of the float bath 100.

The barrier member 120 is used to decrease and/or limit mixing the molten metals M between the wide zone and the narrow zone of the float bath 100, and the barrier member 120 plays a role of keeping the molten metal M at the high temperature upstream in a forming zone. The barrier member 120 of this embodiment is not moved but fixed to the bottom block 110. The barrier member 120 is located very close to the lower surface of the molten glass G while being immersed in the molten metal M stored on the bottom block 110 but is fixed at a location not contacting the lower surface of the molten glass G. Thus, the size (particularly, height) of the barrier member 120 is obvious to those of ordinary skill in the art and is thus not described in detail here.

The barrier member 120 includes a plurality of barriers 121 successively contacting each other and having a predetermined length. Each barrier 121 is made with the same material of the bottom block, for example a firebrick. As mentioned above, the barrier 121 includes the insert portion 122 having a dovetail shape that may be inserted into the slot 112, and a barrier body 124 protruding from the insert portion 122. The conventional carbon material of the barrier member 120 is replaced with refractory material in the present invention so as to prevent any small defects that may occur when the barrier member 120 is oxidized due to oxygen or the like present in the float bath 100.

The side block 130 includes a receiving portion 132 at an area contacting the bottom block 110 of the float bath 100. The receiving portion 132 is formed as a depressed region in the inner side of the side block 130 to have substantially the same width as the second portion 116 of the slot 112.

The placing member 140 is inserted into the receiving portion 132 of the side block 130 and the second portion 116 of the slot 112 to extend at least one end of the barrier member 120 till the side block 130, and thus the placing member 140 plays a role of extending the length of the barrier member 120 over the entire width of the float bath 100. In other words, the placing member 140 contacts at least one end of the barrier member 120 to give a barrier function against the molten metal M over the entire width of the float bath 100 at both sides of the float bath 100. For this purpose, the placing member 140 includes a barrier part 142 located in the second portion 116 of the slot 112, and a side part 144 protruding perpendicular to the barrier part 142 and located at the receiving portion 132 to form substantially the same plane as the side block 130. Thus, the placing member 140 has an "L"-shaped sectional shape. Also, a horizontal portion of the placing member 140 is the barrier part 142, and a vertical portion thereof is the side part 144. The placing member 140 is made of the same material as the side block 130.

In an alternative embodiment, the slot 112 formed in the bottom block 110 of the float bath 100 may have only the first portion 114 while not having the second portion, and the receiving portion 132 of the side block 130 in the former embodiment may function as the second portion. In this case, it would be understood by those of ordinary skill in the art that the receiving portion 132 may be formed to have a sufficient length in a width direction of the side block 130 so that individual barriers 121 may be inserted therein.

The float bath 100 of this embodiment further includes a fastener 150 for fixing the placing member 140 located in the receiving portion 132. The fastener 150 may have a "T" shape, for example, and this T-shaped fastener 150 includes a fixing protrusion 152 that may be inserted into a fastener groove 145 formed in the upper surface of the side part 144 of the placing member 140, and a fastener body 154 extending from the fixing protrusion to be installed to the side block 130. It is obvious to those of ordinary skill in the art that the fastener 150 may use other kinds of coupling members such as a hook and a bolt, in addition to the T shape.

In an alternative embodiment, it is obvious to those of ordinary skill in the art that the barrier member 120 may be applied to various kinds of barrier systems that are fixed in a length direction of the float bath 100.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for installing barriers to a float bath that includes a bottom block with a slot in a width direction thereof and at least one side block connected to the bottom block and extending vertically above the bottom block to form a side wall of the float bath such that the float bath is capable of holding molten metal, wherein a receiving portion is formed in a depressed region extending vertically to the top of an inner side the at least one side block that connects with the bottom block so as to communicate with the slot, the method comprising:
    (a) inserting a barrier member into the slot through the receiving portion;
    (b) positioning a placing member in both the receiving portion and an end portion of the slot to be contacted to one end of the barrier member; and
    (c) fixing the placing member.

2. A float bath, which is installed in accordance with the method of claim 1.

* * * * *